United States Patent
Schirmer et al.

(10) Patent No.: US 7,638,039 B2
(45) Date of Patent: Dec. 29, 2009

(54) IN-SITU CATALYST REPLACEMENT

(75) Inventors: Mark L. Schirmer, Chapel Hill, NC (US); James R. Andies, McDonald, TN (US); Ernest A. Benoit, Ooltewah, TN (US); Jeremy T. Freeman, Durham, NC (US); Thomas W. Hastings, Raleigh, NC (US)

(73) Assignee: Cormetech, Inc., Durham, NC (US)

( * ) Notice: Subject to any disclaimer, the term of this patent is extended or adjusted under 35 U.S.C. 154(b) by 681 days.

(21) Appl. No.: 10/868,125

(22) Filed: Jun. 15, 2004

(65) Prior Publication Data

US 2005/0276734 A1    Dec. 15, 2005

(51) Int. Cl.
*C10G 35/00* (2006.01)
(52) U.S. Cl. .............. 208/152; 208/182; 422/198; 422/199; 422/211; 110/346; 48/126
(58) Field of Classification Search ............ 422/198, 422/199, 211; 208/152, 182; 48/126; 110/245, 110/346; 431/3
See application file for complete search history.

(56) References Cited

U.S. PATENT DOCUMENTS

| | | | |
|---|---|---|---|
| 2,838,461 A | 6/1958 | Kollgaard | |
| 3,041,290 A | 6/1962 | Hubert et al. | |
| 3,294,706 A | 12/1966 | Constabaris et al. | |
| 3,660,308 A | 5/1972 | Hayes | |
| 4,071,324 A | 1/1978 | Reid | |
| 4,198,287 A | 4/1980 | Hemler | |
| 4,238,455 A | 12/1980 | Ogiwara | |
| 4,307,068 A | 12/1981 | Matsumoto et al. | |
| 4,317,713 A | 3/1982 | Burk, Jr. et al. | |
| 4,359,400 A | 11/1982 | Landolt et al. | |
| 4,361,495 A | 11/1982 | Hort et al. | |
| 4,472,358 A | 9/1984 | Khudenko | |
| 4,502,946 A * | 3/1985 | Pronk | 208/152 |
| 4,738,939 A | 4/1988 | Boyle | |
| 4,758,410 A | 7/1988 | Grimm et al. | |
| 4,769,128 A | 9/1988 | Boyle | |
| 4,879,099 A | 11/1989 | Koike | |

(Continued)

FOREIGN PATENT DOCUMENTS

DE     37 13 683 A1    11/1988

(Continued)

OTHER PUBLICATIONS

Translation JP 2002-23945, MItsubishi Heavy Ind, LTD. published Aug. 27, 2002.*

(Continued)

*Primary Examiner*—N. Bhat
(74) *Attorney, Agent, or Firm*—J. Clinton Wimbish; Kilpatrick Stockton LLP

(57) ABSTRACT

The present invention relates generally to catalysts and, in particular, relates to in-situ replacement of catalyst within a reactor. In an embodiment, the present invention comprises a method for the in-situ replacement of catalyst bodies in a catalytic reactor comprising removing catalyst bodies in-situ from at least one modularized section of a catalytic layer within a catalytic reactor and replacing the removed catalyst bodies in-situ with replacement bodies comprising catalytic function wherein at least 10% of the total catalyst bodies within the layer are replaced.

25 Claims, 5 Drawing Sheets

U.S. PATENT DOCUMENTS

| | | |
|---|---|---|
| 5,076,908 A | 12/1991 | Strangeland et al. |
| 5,171,424 A | 12/1992 | Hettinger |
| 5,223,464 A | 6/1993 | Michaelson et al. |
| 5,237,106 A | 8/1993 | Babin et al. |
| 5,328,594 A | 7/1994 | Hettinger |
| 5,387,399 A | 2/1995 | Nishida et al. |
| 5,389,343 A * | 2/1995 | Gentry ............... 422/191 |
| 5,449,501 A | 9/1995 | Luebke et al. |
| 5,470,542 A * | 11/1995 | Stringaro ............ 422/211 |
| 5,505,910 A | 4/1996 | Nishida et al. |
| 5,523,061 A * | 6/1996 | Hao et al. ........... 422/191 |
| 5,690,809 A | 11/1997 | Subramaniam et al. |
| 5,725,756 A | 3/1998 | Subramaniam et al. |
| 5,817,701 A | 10/1998 | Leviness et al. |
| 5,916,529 A | 6/1999 | Scheuerman |
| 6,156,277 A | 12/2000 | Leibacher et al. |
| 6,221,320 B1 * | 4/2001 | Nagaoka ............. 422/218 |
| 6,299,845 B1 * | 10/2001 | Romatier et al. ..... 422/211 |
| 6,541,525 B2 | 4/2003 | Culross |
| 6,683,015 B2 | 1/2004 | Ofori et al. |
| 6,852,302 B1 | 2/2005 | Ukai et al. |
| 6,863,868 B1 | 3/2005 | Alvin |
| 7,033,488 B2 * | 4/2006 | Rockwell ............ 208/152 |
| 2002/0143074 A1 | 10/2002 | Culross et al. |
| 2003/0027709 A1 | 2/2003 | Ofori et al. |
| 2003/0032547 A1 | 2/2003 | Bonitatebus et al. |
| 2003/0073751 A1 | 4/2003 | Culross et al. |
| 2003/0086846 A1 | 5/2003 | Adusei et al. |
| 2003/0092781 A1 | 5/2003 | Soled et al. |
| 2004/0060239 A1 | 4/2004 | Rostrup-Nielsen et al. |
| 2004/0082670 A1 | 4/2004 | Cnossen et al. |
| 2005/0031491 A1 | 2/2005 | Corma et al. |

FOREIGN PATENT DOCUMENTS

| | | |
|---|---|---|
| DE | 3825958 * | 2/1990 |
| EP | 0 061 042 A1 | 9/1982 |
| EP | 0 048 409 B1 | 3/1986 |
| EP | 0 267 511 A2 | 5/1988 |
| EP | 0 295 870 A3 | 9/1989 |
| EP | 0 297 750 A3 | 9/1989 |
| EP | 0 241 310 B1 | 11/1991 |
| EP | 01473569 A1 | 11/2004 |
| GB | 0971551 A | 9/1964 |
| GB | 0995761 A | 6/1965 |
| GB | 1395442 A | 5/1975 |
| JP | 54142178 * | 11/1979 |
| JP | 56113349 | 9/1981 |
| JP | 57-094340 | 11/1982 |
| JP | 61024168 | 2/1986 |
| JP | 01306710 | 12/1989 |
| JP | 06018018 | 1/1994 |
| JP | 11022924 | 1/1999 |
| JP | 11207172 | 8/1999 |
| JP | 02239345 | 8/2002 |
| JP | 04162641 | 6/2004 |
| WO | WO 95/03887 A1 | 2/1995 |
| WO | WO 95/11749 A1 | 5/1995 |
| WO | WO 96/33148 A1 | 10/1996 |
| WO | WO 98/01866 A1 | 1/1998 |
| WO | WO 98/31400 A1 | 7/1998 |
| WO | WO 01/91890 A1 | 12/2001 |
| WO | WO 02/076600 A1 | 10/2002 |
| WO | WO 03/041860 A2 | 5/2003 |

OTHER PUBLICATIONS

Translation DE 3825958, Siemens AG, published Feb. 8, 1990.*

International Search Report mailed Oct. 14, 2005 corresponding to PCT/US2005/020922.

Chu et al., "Comparison of in-situ to ex-situ activities of bitumen-deactivated catalysts," Industrial & Engineering *Chemistry Research*, 1996, 35(11): 4012-4019.

Hums, "Is Advanced SCR technology at a standstill? A provocation for the academic community and catalyst manufacturers," Catalysis Today, 1998, 42(1): 24-35.

Kluytmans, "An airlift loop redox cycle reactor for alcohol oxidations: Hydrodynamics, mass transfer and reactor design," Technische Universiteit Eindhoven, 2003, 64-03C: 735.

Krishnamurthy et al., "Structural characterization of coke deposits on industrial spent paraffin dehydrogenation catalysts," Appl. Catal. A. Gen., 2003, 244(2): 311-321.

Lefers et al., "Modeling of selective catalytic denox reactors—strategy for replacing deactivated catalyst elements," Chemical Engineering & Technology, 1991, 14(3): 192-200.

Oxidation Catalyst, as printed from http://www.catalystproducts.com/12128/13052.html on Feb. 5, 2008.

Seamans et al., "Improved regeneration quality and possibility with LDG (Length and Density Grading) regenerated catalyst," American Chemical Society, Division of Petroleum Chemistry, Preprints, 1988, 33(4): 549-555.

Staudt, "Minimizing the impact of SCR catalyst on total generating cost through effective catalyst management," ASME Power Div. Publ. PWR., 2004, 35: 733-742.

Written Opinion of the International Searching Authority mailed Oct. 14, 2005 for Patent Cooperation Treaty Serial No. PCT/US2005/020922.

* cited by examiner

| 6 | 7* | 8* | 9*** | 10* | 11*** |
|---|---|---|---|---|---|
| 5*** | 24 | 25*** | 26 | 27*** | 12* |
| 4* | 23*** | 35 | 34*** | 28 | 13*** |
| 3*** | 22 | 33*** | 36 | 29*** | 14* |
| 2* | 21*** | 32 | 31*** | 30 | 15*** |
| 1*** | 20* | 19*** | 18* | 17*** | 16** |

FIGURE 4

IN-SITU CATALYST REPLACEMENT

FIELD OF THE INVENTION

The present invention relates generally to catalysts and, in particular, relates to in-situ replacement of catalyst within a reactor. In an embodiment, the present invention provides a method for the in-situ removal and replacement of catalyst bodies within modularized sections of catalytic layers within a catalytic reactor. The present invention also provides new catalysts and catalytic reactors.

BACKGROUND OF THE INVENTION

The terminology catalytic reactor is generally used to describe a vessel comprising a catalyst. Catalytic reactors are used to catalyze chemical reactions in fluid streams passing through the reactor. Catalyst reactors generally comprise catalytic structures containing fluid flow paths that enable contact between the fluid streams and catalytically active components of the catalytic structure. The catalytic structure of a modular catalytic reactor is typically composed of one or more catalytic layers with each layer comprising a large number of modularized sections. Each modularized section further comprises a metal support framework which holds a large number of catalyst bodies in place wherein sealing or packing materials between the catalyst bodies is used if necessary for proper flow distribution of fluid streams passing through the catalyst bodies. The catalyst bodies contain the catalytic composition and display a physical structure that delineates flow channels or passageways for fluid flow through the catalyst bodies.

Catalyst bodies within modularized sections of catalytic layers in a catalytic reactor may need replacement for a variety of reasons. Catalyst bodies with more desirable properties may become available. Moreover, the catalytic function within catalyst bodies can degrade due to exposure to operating conditions which include poisoning or masking by species that bind to or obstruct the efficient contact of fluid components with catalytic sites. Catalyst bodies can additionally become plugged as a result of being exposed to fluids containing high contents of particulate matter. Plugging by particulate matter degrades the catalytic function of catalyst bodies by precluding the efficient flow of fluids through the bodies for reaction with the catalytic material therein.

Spent catalyst bodies within modularized sections of catalytic layers in a reactor are replaced in order to maintain or improve the overall catalytic efficiency of the reactor. Replacement of catalyst bodies by removal of modularized sections of a catalytic reactor is an expensive and time consuming process. The replacement generally requires cutting open one or more welded catalyst loading doors, removing modularized catalyst sections that contain spent or damaged catalyst bodies from the catalytic reactor and inserting replacement modularized sections. Removing modularized sections from the reactor is time consuming and costly since the removal process requires specialized rigging. Typical modularized sections may have dimensions of 38 inches×63 inches×75 inches and a weight up to several thousand pounds. In existing procedures, once the modularized sections are removed from the catalytic reactor, they must be transported to an onsite or offsite location for either storage, disposal, recycling, cleaning, or replacement of the spent catalyst bodies, or for rejuvenation of catalytic functionality using, for example, a regeneration process. The transportation of the modularized sections increases the cost and time associated with replacing catalyst bodies within a reactor.

In view of the disadvantages of existing procedures, it would be desirable to provide methods for replacing catalyst bodies within modularized sections of a catalytic reactor that provide increased cost and time efficiencies over present replacement methods.

SUMMARY OF THE INVENTION

The present invention provides methods for replacing catalyst bodies within modularized sections of one or more catalytic layers of a catalytic reactor. As used herein, catalyst bodies can comprise catalyst elements and catalyst cartridges. In an embodiment, a method comprises the in-situ removal and replacement of catalyst bodies. The present invention additionally provides methods for the replacement of catalytic layers within a catalytic reactor.

The in-situ nature of an embodiment of a method of the present invention decreases costs and time delays associated with previous catalyst removal and replacement methods for catalytic reactors.

In an embodiment of the present invention, a method for the in-situ replacement of catalyst bodies in a reactor comprises removing catalyst bodies in-situ from modularized sections of catalytic layers within a catalytic reactor and replacing the removed catalyst bodies in-situ with replacement catalyst bodies. The method may further comprise the step of identifying catalyst bodies that have reduced catalytic efficiency prior to their removal. Generally, the method includes replacing at least 10% of the total catalyst bodies within a catalytic layer of a catalytic reactor. In an embodiment, the method may additionally comprise the steps of sealing the periphery of replacement catalyst bodies to minimize bypass of the replacement catalyst bodies by a fluid stream passing through the reactor. In another embodiment, the method of the present invention may further comprise completing the in-situ removal and replacement of catalyst bodies within modularized sections of catalytic layers of a catalytic reactor within a certain time period.

In an embodiment, the present invention additionally provides a catalytic layer comprising a plurality of catalyst bodies wherein at least 10% of the bodies have a catalytic activity greater than the remainder of catalyst bodies. In another embodiment, the present invention provides a catalytic reactor comprising at least one catalytic layer comprising a plurality of catalyst bodies wherein at least 10% of the bodies have a catalytic activity greater than the remainder of catalyst bodies in the layer. In a further embodiment, the present invention provides a catalytic reactor comprising at least one catalytic layer comprising a plurality of catalyst bodies wherein at least 10% of the bodies comprise in-situ replacement catalyst bodies.

A feature and advantage of the present invention is that in an embodiment the method of the present invention reduces costs associated with the replacement of catalyst bodies within modularized sections of catalytic layers of a catalytic reactor in comparison to prior methods.

Another feature and advantage of the present invention is that in an embodiment the method of the present invention reduces the time required to replace catalyst bodies within modularized sections of catalytic layers of a catalytic reactor in comparison to prior methods.

A further feature and advantage of the present invention is that in an embodiment the method of the present invention reduces the amount of waste produced in replacing catalyst bodies within modularized sections of catalytic layers of a catalytic reactor by facilitating the reuse of metal framework components of the sections contained therein.

A still further feature and advantage of the present invention is that in an embodiment the method of the present invention reduces the amount of time a catalytic reactor remains offline during the removal and replacement of catalyst bodies within modularized sections of catalytic layers of a catalytic reactor in comparison to prior art methods.

With the foregoing and other advantages and features of the invention that will become hereinafter apparent, the nature of the invention may be more clearly understood by reference to the following non-limiting detailed description of the invention and the several views illustrated in the drawings.

BRIEF DESCRIPTION OF THE FIGURES

FIG. 4 illustrates a catalyst body replacement scheme according to an embodiment of the present invention.

DETAILED DESCRIPTION OF THE INVENTION

Figure 1:
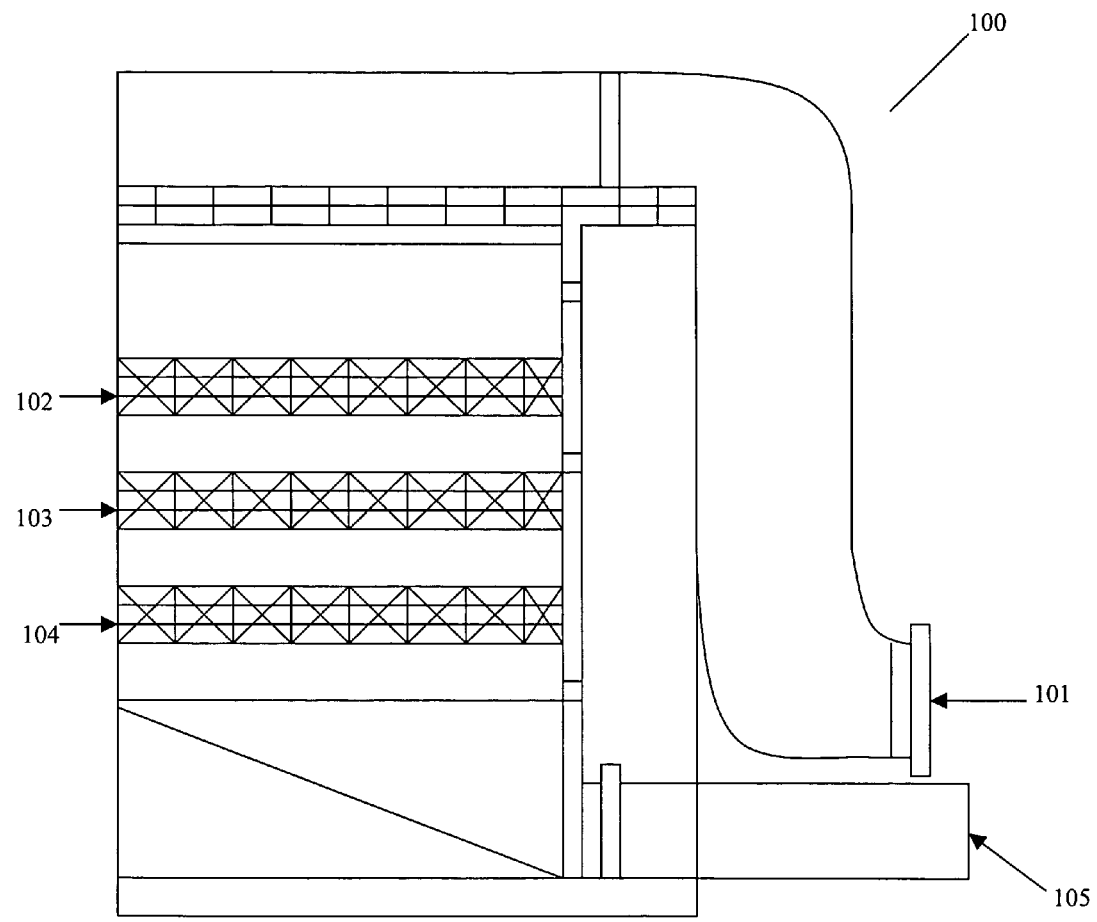
FIG. 1 illustrates a catalytic reactor according to an embodiment of the present invention.

In an embodiment, the present invention provides a method for in-situ replacement of catalyst bodies within modularized sections of one or more catalyst layers of a catalytic reactor. The present invention additionally provides methods for the in-situ replacement of catalytic layers within a catalytic reactor. Catalyst reactors suitable for use with methods of the present invention comprise one or more layers of modularized sections wherein each modularized section comprises a plurality of catalyst bodies comprising monolithic structural catalyst elements and/or plate catalyst elements. The modularized sections of catalytic reactor according to embodiments of the present invention display dimensions too large to be handled manually and, therefore, require specialized rigging for removal from the catalytic reactor.

The in-situ removal and replacement of catalyst bodies according to methods of the present invention reduces time and cost considerations associated with prior art methods. Prior art processes for catalyst body removal and replacement required the cutting open of welded catalyst loading doors in order to access and remove modularized sections from the catalytic reactor. The methods of the present invention preclude the requirement of cutting open the loading doors of the catalytic reactor for removal of modularized sections of catalytic layers containing spent or damaged catalyst bodies to be replaced. Access to the catalytic layers and modularized sections within a catalytic reactor in embodiments of the present invention can be provided by a man-way entry door or doors available for reactor ingress or egress by workers and catalyst bodies.

In an embodiment of the present invention, a method for the in-situ replacement of catalyst bodies in a reactor comprises removing catalyst bodies in-situ from modularized sections of catalytic layers within a catalytic reactor and replacing the removed catalyst bodies in-situ with replacement bodies comprising catalytic function. The method may further comprise the step of identifying catalyst bodies that have reduced catalytic efficiency prior to their removal. Identification of catalyst bodies having a reduced catalytic efficiency can comprise visual inspection or spot sampling in conjunction with tests of chemical, physical, or catalytic performance properties. Moreover, the catalytic efficiency of catalytic layers within the reactor can be determined by monitoring the performance of the catalytic reactor.

Generally, at least 10% of the total catalyst bodies within a catalytic layer of a catalytic reactor are replaced. In an embodiment of the present invention, greater than 20% of the total catalyst bodies within a catalytic layer are replaced. In another embodiment of the present invention, greater than 40% of the total catalyst bodies in a catalytic layer are replaced. In a further embodiment of the present invention, a majority of the total catalyst bodies in a catalytic layer are replaced. In certain embodiments of the present invention substantially all of the catalyst bodies in a catalytic layer are replaced.

The method may additionally comprise a step of sealing the periphery of replacement catalyst bodies to minimize bypass of the replacement catalyst bodies by a fluid stream passing through the reactor. Sealing the periphery of replacement catalyst bodies can comprise wrapping the replacement catalyst bodies with packing material.

In an embodiment, the method of the present invention may further comprise completing the in-situ removal and replacement of catalyst bodies within modularized sections of catalytic layers of a catalytic reactor within a certain time period. In an embodiment, the time period can be correlated to the periodic maintenance of a catalytic reactor wherein the reactor goes offline and is subsequently restarted after completion of the maintenance. In some embodiments, the in-situ removal and replacement of catalyst bodies within modularized sections of catalytic layers within a catalytic reactor can be completed in less than 21 days. In other embodiments of the present invention, the in-situ removal and replacement of catalyst bodies within modularized sections of catalytic layers within a catalytic reactor can be completed in less than 14 days. In a further embodiments, the in-situ removal and replacement of catalyst bodies within modularized sections of catalytic layers within a catalytic reactor can be completed in less than 7 days.

The removal of catalyst bodies may be accomplished by a variety of methods and the present invention should not be construed as being limited to any single method for removing the catalyst bodies. In an embodiment, removing catalyst bodies from modularized sections of a catalytic layer in-situ can comprise pushing a plurality of catalyst bodies out of the modularized sections of the layer. Catalyst bodies can be pushed out of modularized sections of a layer from a location adjacent to the layer. A mallet can be used to tap the catalyst bodies out of the modularized sections. The method used to tap the catalyst bodies out of the modularized sections can be hydraulically or pneumatically conducted or can be conducted by a worker. When removing catalyst bodies from a modularized section within a catalytic layer, other modularized sections in the layers of the catalytic reactor can be covered to prevent clogging by debris produced in the removal of the catalyst bodies. A sheet or planking, for example, can be used to cover modularized sections in the catalytic layers of a reactor.

In another embodiment of the present invention, removing catalyst bodies from modularized sections of a catalytic layer in-situ can comprise pulling a plurality of catalyst bodies out of the modularized sections of the layer. Catalyst bodies can be pulled out of the modularized sections with an extraction device. The extraction device can comprise a tool that possesses teeth that extend once the device is driven into the modularized section to grab a catalyst body thereby allowing an operator to pull the body out of the modularized section. Pulling catalyst bodies out of the catalytic layer can be useful when access to a side of the catalytic layer is restricted or otherwise not feasible. When pulling catalyst bodies from a modularized section within a catalytic layer, other modularized sections in the layers of the catalytic reactor can be covered to prevent clogging by debris produced in the removal of the catalyst bodies.

In a further embodiment, removing catalyst bodies from modularized sections of a catalytic layer in-situ can comprise pushing and pulling a plurality of catalyst bodies out of modularized sections of the layer. In one embodiment, a mallet can be used from one side of the modularized section to push at least one or more, starter catalyst bodies out of the section. The remaining catalyst bodies can be removed from the modularized section by pulling them from the section. When removing catalyst bodies from a modularized section within a catalytic layer, other modularized sections in the layers of the catalytic reactor can be covered to prevent clogging by debris produced in the removal of the catalyst bodies.

In still further embodiments, catalyst bodies can be removed from modularized catalyst sections by any other means known to those of ordinary skill in the art.

Once catalyst bodies within a modularized section of a catalytic layer are removed, the framework of the modularized section can be cleaned, and the replacement catalyst bodies comprising catalytic function can be inserted into the framework of the modularized section. In this capacity, the modularized sections of the present invention previously containing removed catalyst bodies are reused to support replacement catalyst bodies within catalytic layers of a catalytic reactor. Reusing modularized sections reduces the amount of waste produced in replacing catalyst bodies in modularized sections of catalytic layers within a catalytic reactor. In embodiments of the present invention, replacing the removed catalyst bodies in-situ with replacement catalyst bodies having catalytic function comprises arranging replacement catalyst bodies within the modularized sections of the layer.

In an embodiment, arranging replacement catalyst bodies within a modularized section of a layer comprises sequentially inserting replacement catalyst bodies into the modularized section beginning along the wall of the modularized section and continuing the sequential insertion of replacement catalyst bodies into the modularized section until the modularized section is full with replacement catalyst bodies. An insertion device can be used to insert replacement catalyst bodies into the modularized section. The insertion device can comprise a thin metal plate to assist in sliding the replacement catalyst bodies into position within the modularized section. The insertion device can be used with replacement catalyst bodies regardless of whether or not the catalyst bodies have packing material for sealing purposes. In some embodiments, two insertion devices can be used to insert a replacement catalyst body into a modularized section. In other embodiments, three insertion devices can be used for insertion of a replacement catalyst body into a modularized section. In a further embodiment, four insertion devices can be used for insertion of a replacement catalyst body into a modularized section.

In another embodiment, a method of the present invention further comprises attaching a removable fixture to the lower section of a modularized section. The fixture can serve as a support for the replacement catalyst bodies as they are inserted into the modularized section. Moreover, the fixture can serve as a platform on which to work within the modularized section.

In another embodiment, a method of the present invention further comprises a transporter inside a catalytic reactor operable for transporting the removed and replacement catalyst bodies. Transporters suitable for use with the methods of the present invention can comprise a roller-bed conveyor. Catalyst bodies can be placed on the transporter or carriers thereupon for easy transport into and out of the catalytic reactor. Moreover, the transporter can be moved within the catalyst reactor to allow for an efficient path into and out of the reactor. In some embodiments, more than one transporter can be placed within a catalytic reactor for the efficient transport of removed and replacement catalyst bodies.

In an embodiment of the present invention, replacing the removed catalyst bodies with a replacement catalyst bodies having catalytic function may further comprise sealing the periphery of replacement catalyst bodies by the in-situ wrapping of at least one side of at least one replacement catalyst body with a packing material. It is generally advantageous for a replacement catalyst body to seal sufficiently to minimize bypass of the catalyst body by a stream flowing through the reactor. In an embodiment, the packing material can be used in-situ in conjunction with the sequential insertion of replacement catalyst bodies to achieve a desired compression between individual replacement catalyst bodies and between replacement catalyst bodies and the framework of the modularized section to maintain a seal.

In another embodiment, the wrapping of replacement catalyst bodies with packing material for sealing purposes can occur at a location outside the catalytic reactor. The replacement catalyst bodies can be wrapped with packing material before being shipped to the site of the catalytic reactor. Moreover, the replacement catalyst bodies can be wrapped near the site of the catalytic reactor before being transported into the reactor for placement into the modularized sections of a catalytic layer.

In an embodiment, a replacement catalyst body has packing on at least one side. In some embodiments, a replacement catalyst body can have packing on two adjoining sides of the catalyst body. In other embodiments, a replacement body can have packing on three sides of the catalyst body. In a further embodiment, a replacement catalyst body can demonstrate packing on all four sides of the catalyst body. In a still further embodiment, a catalyst body can display no packing on the sides of the catalyst body.

Packing materials suitable for use in the present invention comprise materials that display a compressible thickness. Suitable packing materials can comprise woven fiberglass tape, ceramic blanketing materials, ceramic fiber materials, or other packing materials suitable for sealing purposes. In an embodiment of the present invention, the packing material is operable to be compressed from about 20% to about 60% its original thickness when inserted into the modularized section on a replacement catalyst body. In another embodiment of the present invention, the packing material is operable to be compressed to about 35% of its original thickness when inserted into the modularized section on a replacement catalyst body.

In embodiments, any of the previously described steps or aspects of methods of the present invention can be performed in parallel with one another in any combination to maximize cost and time efficiencies of replacing catalyst bodies within modularized sections of catalytic layers within a catalytic reactor. Removal and replacement of catalyst bodies within a modularized section of a catalytic layer, for example, can be conducted contemporaneously in an embodiment of a method of the present invention. In this embodiment, a plurality of transporters can be used within a catalytic reactor for the simultaneous movement of removed catalyst bodies out of the reactor and the movement of replacement catalyst bodies into the reactor.

Moreover, in another embodiment, work crews inside and outside a catalytic reactor can be organized for performing all steps and aspects of methods of the present invention in a cost and time efficient manner. A work crew outside the catalytic reactor, for example, can conduct replacement catalyst body wrapping while a work crew inside the catalytic reactor can simultaneously remove catalyst bodies from modularized sections of catalytic layers within a reactor. The concerted nature of performing steps and aspects of methods of the present invention according to the present embodiments facilitates the realization of cost and time efficiencies not present in prior art methods of catalyst body replacement with modularized sections of a catalytic reactor.

In an embodiment, the present invention additionally provides a catalytic layer comprising a plurality of catalyst bodies wherein at least 10% of the catalyst bodies have a catalytic activity greater than the remainder of catalyst bodies in the layer. In another embodiment, a catalytic layer comprises a plurality of catalyst bodies wherein greater than 20% of the catalyst bodies have a catalytic activity greater than the remainder of catalyst bodies in the layer. In a further embodiment, a catalytic layer comprises a plurality of catalyst bodies wherein greater than 40% of the catalyst bodies have a catalytic activity greater than the remainder of catalyst bodies in the layer. In another embodiment, a catalytic layer comprises a plurality of catalyst bodies wherein a majority of the catalyst bodies have a catalytic activity greater than the remainder of catalyst bodies in the layer.

In an embodiment, the present invention provides a catalytic reactor comprising at least one catalytic layer comprising a plurality of catalyst bodies wherein at least 10% of the catalyst bodies have a catalytic activity greater than the remainder of catalyst bodies in the layer. In another embodiment, a catalytic reactor comprises at least one catalytic layer comprising a plurality of catalyst bodies wherein greater than 20% of the catalyst bodies have a catalytic activity greater than the remainder of catalyst bodies in the layer. In a further embodiment, a catalytic reactor comprises at least one catalytic layer comprising a plurality of catalyst bodies wherein greater than 40% of the catalyst bodies have a catalytic activity greater than the remainder of catalyst bodies in the layer. In another embodiment, a catalytic reactor comprises at least one catalytic layer comprising a plurality of catalyst bodies wherein a majority of the catalyst bodies have a catalytic activity greater than the remainder of catalyst bodies in the layer.

In embodiments of the present invention wherein a percentage of catalyst bodies have a catalytic activity greater than the remainder of catalyst bodies in a layer, each catalyst body in the layer displays an initial catalytic activity. As previously discussed, the initial catalytic activity of the catalyst bodies in a layer degrades or decreases over time in response to various catalytic reactor operating factors. The percentage of catalyst bodies having a catalytic activity greater than the remainder of catalyst bodies in the layer, however, comprise a catalytic activity substantially equal to the initial catalytic activity of all catalyst bodies in the layer.

In certain embodiments, a catalytic reactor comprises at least one catalytic layer comprising a plurality of catalyst bodies wherein substantially all of the catalyst bodies comprise replacement catalyst bodies.

In another embodiment, the present invention provides a catalytic reactor comprising at least one catalytic layer comprising a plurality of catalyst bodies wherein at least 10% of the catalyst bodies comprise in-situ replacement catalyst bodies.

Referring now to the figures wherein like numerals represent like elements throughout the several figures, FIG. 1 illustrates a catalytic reactor according to an embodiment of the present invention. Fluid streams flow into the catalytic reactor 100 through an entrance manifold 101. Once inside the catalytic reactor 100, fluid streams flow through several catalytic layers 102, 103, 104 comprising modularized sections (not shown) which contain catalyst bodies (not shown) that conduct catalyzed reactions within the fluid streams. After passing through the catalytic layers 102, 103, 104, fluid streams flow out of the catalytic reactor through an exit manifold 105.

Figure 2:
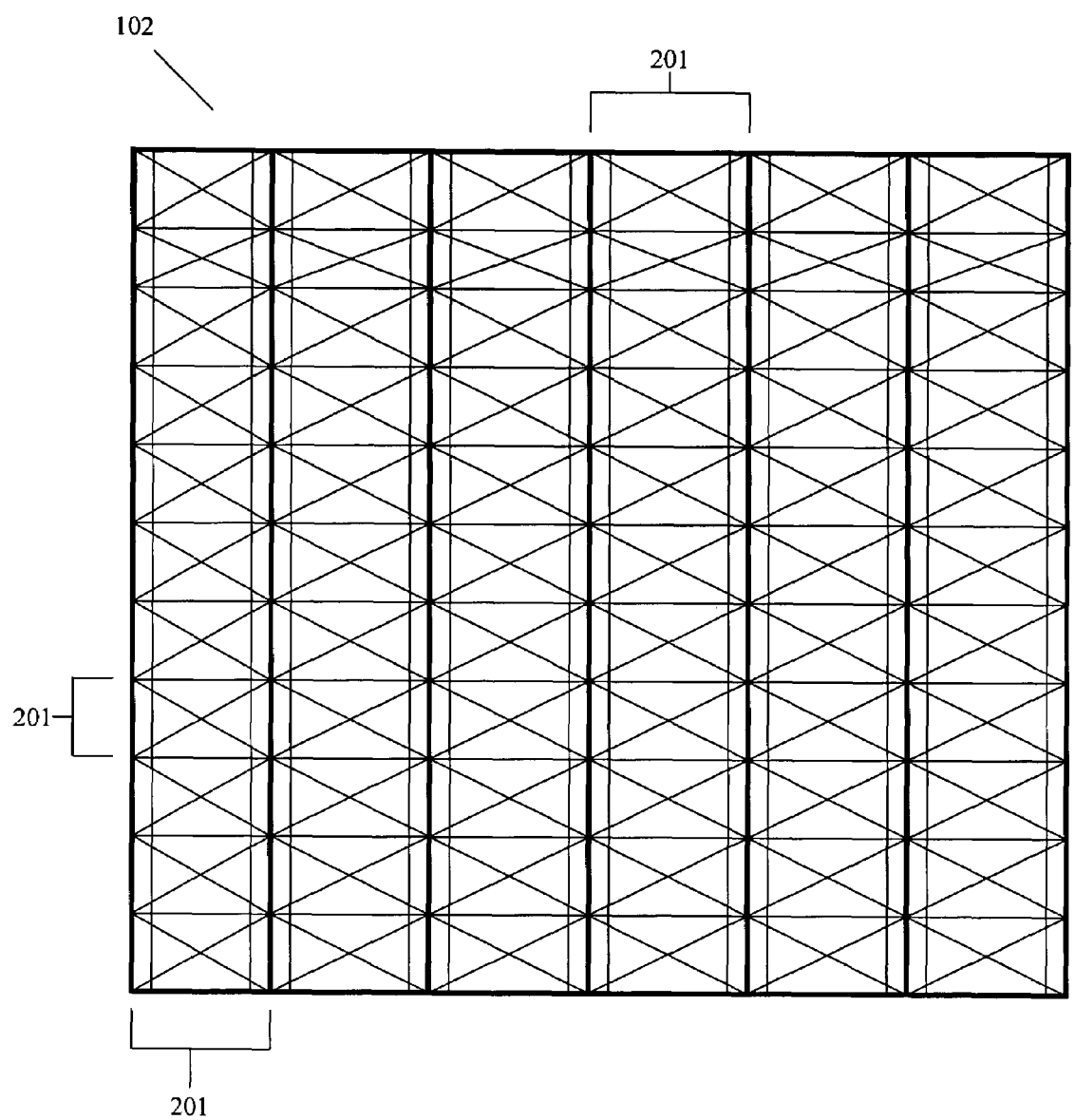
FIG. 2 illustrates a plan view of a modularized catalytic layer of a catalytic reactor according to an embodiment of the present invention.

FIG. 2 illustrates a plan view of a modularized catalytic layer according to an embodiment of the present invention. The modularized catalytic layer 102, comprises an array of modularized sections 201 which contain catalyst bodies (not shown) for conducting catalytic reactions in fluid streams passing through the catalytic layer 102.

Figure 3:
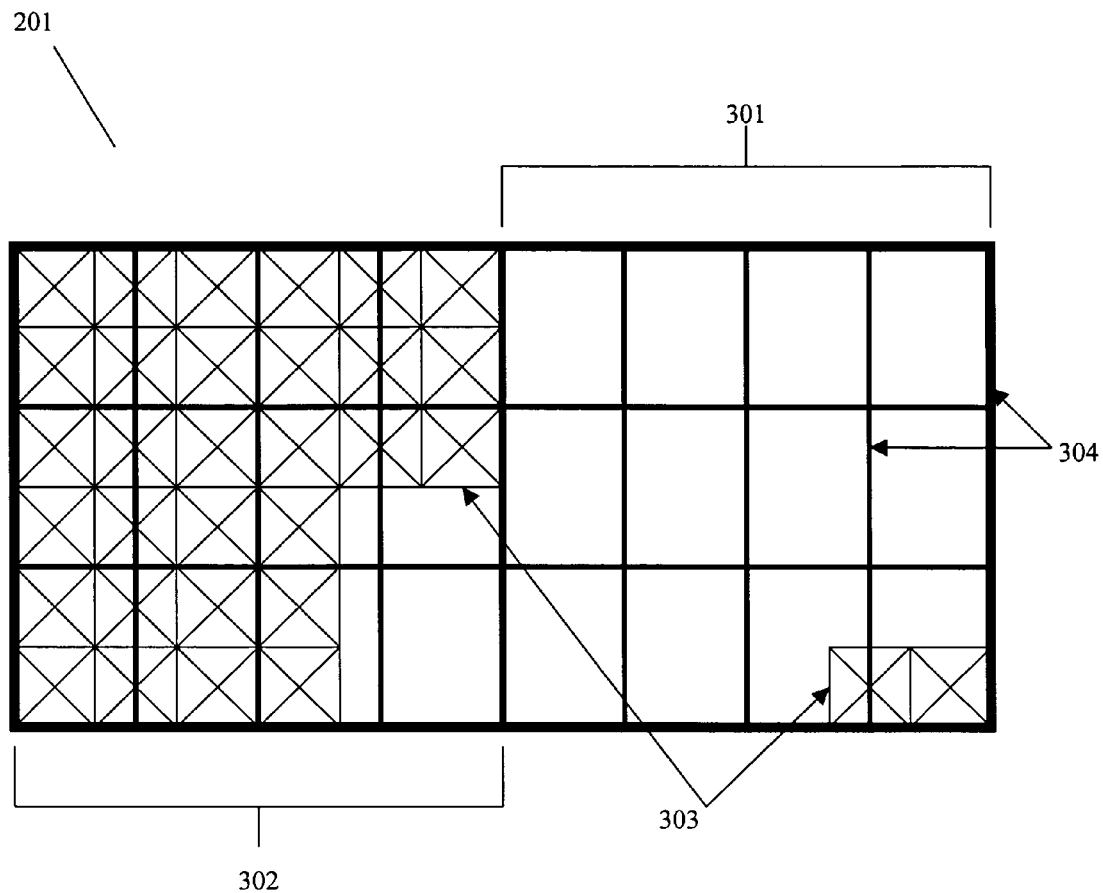
FIG. 3 illustrates an individual modularized section of a of a modularized catalytic layer according to an embodiment of the present invention.

FIG. 3 illustrates an individual modularized section of a of a modularized catalytic layer according to an embodiment of the present invention. The modularized section 201 comprises two sides 301, 302. Catalyst bodies 303 are inserted into the modularized section 201 and supported by the framework 304 of the modularized section. One side 302 of the modularized section 201 displayed in FIG. 3 is almost full of catalyst bodies 303 while the remaining side 301 comprises two catalyst bodies 303.

FIG. 4 illustrates a catalyst body replacement scheme according to an embodiment of the present invention. As displayed in FIG. 3, a modularized section according to embodiments of the present invention can comprise two sides. FIG. 4 demonstrates a packing scheme for one side of the modularized section that can be repeated for the other side of the modularized section.

As displayed in FIG. 4, by way of example, a first replacement catalyst body may be inserted into a corner of one side of a modularized section. The remaining replacement catalyst bodies may be inserted sequentially in a clockwise manner around the inner perimeter of one side of the modularized section. In some embodiments, the ordering of the last several catalyst bodies may be varied as shown to facilitate the insertion of the last two catalyst bodies. Insertion of replacement catalyst bodies may be continued in a clockwise or spiral fashion until the modularized section is complete with catalyst bodies. In FIG. 4, replacement catalyst bodies without an asterisk display no packing material while replacement catalyst bodies with a single asterisk demonstrate packing material on one side of the catalyst body. Additionally, replacement catalyst bodies with two asterisks display packing on two adjoining sides of the catalyst body and replacement catalyst bodies with three asterisks display packing on all four sides of the catalyst body.

Figure 5:
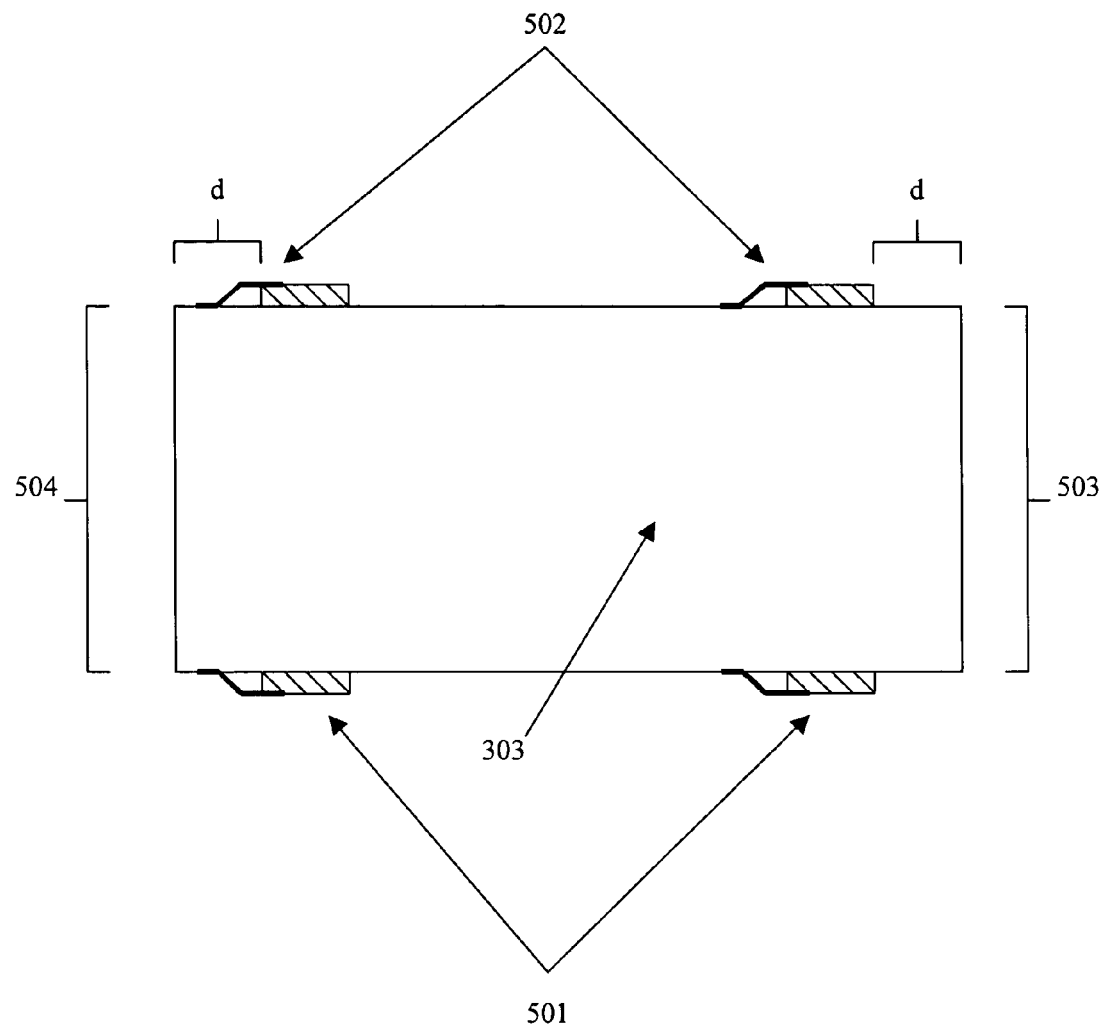
FIG. 5 illustrates catalyst element wrapping according to an embodiment of the present invention.

FIG. 5 illustrates catalyst element wrapping according to an embodiment of the present invention. As displayed in FIG. 5, the packing material 501 can be attached to a replacement catalyst element 303 with tape 502 at a distance "d" from each face 503, 504 of the catalyst element 303. The distance "d" will generally be chosen to facilitate proper sealing with minimal material usage. In an embodiment of the present invention, the distance d may range from about 6.4 mm to about 25.5 mm.

In the embodiment shown in FIG. 5, the packing material 501 is not continuous along the wall or walls of the replacement catalyst element 303. A strip of packing material 501 is attached at a distance "d" from one face of the catalyst element 503 and a strip of packing material 501 is attached at a distance "d" from the opposing face of the catalyst element 504 wherein the wall between the two strips of packing material remains bare. In embodiments of the present invention, the strip of packing material 501 can display a width ranging from about 25.5 mm to about 76.5 mm and a non-compressed thickness ranging from about 2.5 mm to about 7.6 mm.

In other embodiments, the packing material 501 can be continuous along the entire wall of a replacement catalyst element 303. In one embodiment, the width of the packing material 501 can be less than or equal to about 1400 mm.

In embodiments of the present invention, removed catalyst bodies and replacement catalyst bodies can comprise catalyst elements and cartridges comprising catalyst compositions for catalyzing chemical reactions in combustion flue gas streams including the selective catalytic reduction of nitrogen oxides, the oxidation of elemental mercury, and the catalytic destruction of dioxins and furans. Catalyst bodies according to embodiments of the present invention can additionally comprise catalyst elements and cartridges comprising compositions for the selective catalytic reduction of nitrogen oxides in fluid streams produced in plants manufacturing or using nitric acid. In another embodiment, catalyst elements can comprise those described in U.S. patent application Ser. No. 10/801,140 to DiFrancesco et al. and U.S. Provisional Patent. Application titled "Catalyst Systems Advantageous for High Particulate Matter Environments" by DiFrancesco et al. filed on May 4, 2004, both of which are hereby incorporated by reference. In another embodiment, the removed catalyst bodies can comprise catalyst bodies that are plugged, cracked, or otherwise damaged.

In some embodiments of the present invention, the removed catalyst bodies and the replacement catalyst bodies comprise substantially the same catalyst composition, geometrical shape, or flow channel shape. In other embodiments, the removed catalyst bodies and the replacement catalyst bodies comprise different catalyst compositions, geometrical shape, or flow channel shape. The interchangeability of catalyst compositions between the removed catalyst bodies and the replacement catalyst bodies provides catalytic reactors with a high level of adaptability to various industrial processes.

It is to be understood that the foregoing description and specific embodiments are merely illustrative of the best mode of the invention and the principles thereof, and that various modifications and additions may be made to the methods by those skilled in the art, without departing from the spirit and scope of this invention.

What is claimed is:

1. A method for the in-situ replacement of catalyst bodies in a catalytic reactor comprising:
   removing catalyst bodies in-situ from at least one modularized section of a catalytic layer within a flue gas catalytic reactor wherein the catalyst bodies are in contact with one another and replacing the removed catalyst bodies in-situ with replacement bodies comprising catalytic function wherein the replacement catalyst bodies are in contact with one another in the modularized section and at least 10% of the total catalyst bodies within the layer are replaced.

2. The method of claim 1, wherein the majority of catalyst bodies within the layer are replaced.

3. The method of claim 1, wherein substantially all of the catalyst bodies within the layer are replaced.

4. The method of claim 1 further comprising inspecting catalyst bodies prior to removing the catalyst bodies from at least one modularized section of a catalytic layer within a catalytic reactor.

5. The method of claim 1, wherein removing catalyst bodies from at least one modularized section of a catalytic layer comprises pushing the catalyst bodies out of the modularized section.

6. The method of claim 1, wherein removing catalyst bodies from at least one modularized section of a catalytic layer comprises pulling the catalyst bodies out of the modularized section.

7. The method of claim 6, wherein the catalyst bodies are pulled from the modularized section with an extraction device.

8. The method of claim 1, wherein removing catalyst bodies from at least one modularized section comprises pushing and pulling the catalyst bodies out of the modularized section.

9. The method of claim 1, further comprising installing at least one transporter inside the catalyst reactor operable for transporting removed catalyst bodies and replacement catalyst bodies.

10. The method of claim 9, wherein the transporter comprises a roller-bed conveyor.

11. The method of claim 1, further comprising covering modularized sections within catalytic layers of the reactor with a protective cover.

12. The method of claim 1, wherein replacing the removed catalyst bodies with replacement catalyst bodies having catalytic function comprises arranging replacement catalyst bodies within the modularized section.

13. The method of claim 12, wherein arranging comprises:
   sequentially inserting replacement catalyst bodies into the modularized section beginning along the wall of the modularized section and;
   continuing the sequential insertion of replacement catalyst bodies into the modularized section until the modularized section is full of catalyst bodies.

14. The method of claim 13, wherein the replacement catalyst bodies are sequentially inserted into the modularized section using at least one insertion device.

15. The method of claim 1 further comprising sealing the periphery of replacement catalyst bodies to minimize bypass of the replacement catalyst bodies by a fluid stream passing through the catalytic reactor.

16. The method of claim 15, wherein sealing comprises wrapping at least one side of at least one replacement catalyst body with a packing material.

17. The method of claim 16, wherein the packing material comprises woven fiberglass tape, ceramic blanketing materials, or ceramic fiber materials.

18. The method of claim 1, wherein the removed catalyst bodies and the replacement catalyst bodies comprise substantially the same catalyst composition.

19. The method of claim 1, wherein the removed catalyst bodies and the replacement catalyst bodies comprise substantially different catalyst compositions.

20. The method of claim 1, wherein the removed catalyst bodies comprise a catalyst composition for the selective catalytic reduction of nitrogen oxides.

21. The method of claim 1 wherein the replacementcatalyst bodies comprise a catalyst composition for the selective catalytic reduction of nitrogen oxides.

22. The method of claim 1, wherein the removed catalyst bodies comprise a catalyst composition for the oxidation of elemental mercury.

23. The method of claim 1, wherein the replacement catalyst bodies comprise a catalyst composition for the oxidation of elemental mercury.

24. The method as in any one of the previous claims, wherein the catalyst bodies comprise catalyst elements.

25. A method for the in-situ replacement of catalyst bodies in a catalytic reactor comprising:

removing catalyst bodies in-situ from at least one modularized section of a catalytic layer within a flue gas catalytic reactor wherein the catalyst bodies are in contact with one another; and replacing the removed catalyst bodies in-situ with replacement bodies comprising catalytic function by sequentially inserting the replacement catalyst bodies into the at least one modularized section along a wall of the modularized section wherein at least 10% of the total catalyst bodies witnin the layer are replaced.

\* \* \* \* \*

UNITED STATES PATENT AND TRADEMARK OFFICE
CERTIFICATE OF CORRECTION

| | | |
|---|---|---|
| PATENT NO. | : 7,638,039 B2 | Page 1 of 1 |
| APPLICATION NO. | : 10/868125 | |
| DATED | : December 29, 2009 | |
| INVENTOR(S) | : Schirmer et al. | |

It is certified that error appears in the above-identified patent and that said Letters Patent is hereby corrected as shown below:

On the Title Pg.

Item [*] Notice: Subject to any disclaimer, the term of this patent is extended or adjusted under 35 USC 154(b) by 681 days.

Delete the phrase "by 681 days" and insert -- by 1350 days --

Signed and Sealed this

Eighteenth Day of May, 2010

David J. Kappos
*Director of the United States Patent and Trademark Office*